Aug. 10, 1937.　　　J. C. WHITESELL, JR　　　2,089,242
STRUCTURAL SHEET MATERIAL
Filed April 16, 1932

INVENTOR
John C. Whitesell Jr.
BY
ATTORNEY

Patented Aug. 10, 1937

2,089,242

UNITED STATES PATENT OFFICE 2,089,242

STRUCTURAL SHEET MATERIAL

John C. Whitesell, Jr., Norristown, Pa., assignor to Edward G. Budd Manufacturing Company, Philadelphia, Pa., a corporation of Pennsylvania Application April 16, 1932, Serial No. 605,573

1 Claim. (Cl. 29—180)

My invention relates to structural sheet material and more especially to corrugated material having the workable characteristics of a plain sheet. The principal object of my invention is to make a corrugated structural sheet metal material having a greater tensile strength than plain sheets while at the same time being workable in substantially the same manner as a plain sheet.

Another desirable characteristic of my invention is found, in that, it may be welded as by spot welding, giving a joint of appreciably greater tensile strength than is attainable from a joint between plain sheets.

My invention will be better understood from the following description when considered in connection with the accompanying drawing and its scope will be pointed out in the appended claim.

In the accompanying drawing wherein like ordinals represent corresponding parts in the various figures, Fig. 1 shows a sheet of material made in accordance with my invention.

In accordance with my invention I take plain sheet material and by means of cold working, as by drawing or other suitable operations, corrugate the same in a manner so as to give to the corrugations a pitch approximately three times the thickness of the metal.

Pitch, as herein used, designates the distance between the same relative point upon two consecutive crests or undulations upon the same side of the medial plane of a sheet. If for example the sheet thickness was approximately 0.012 inch the pitch might be about 0.030 inch more or less. The effective thickness of a corrugated sheet as herein made would likewise be about 0.036 inch measuring between the planes coextensive with outside of the crests upon the opposite sides of the medial plane of the sheet. It is preferable that the internal radius of the corrugations should not be less than the metal thickness and obviously either a sine form or a form approaching a saw tooth shape may be used.

In drilling, cutting, welding or other working of a sheet of this sort the ease of operations is equivalent to the ease of performing the same operation upon a plane sheet of metal.

Figure 1:
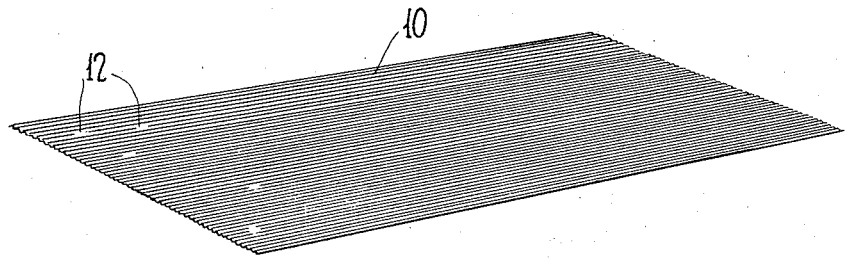
Figure 2:
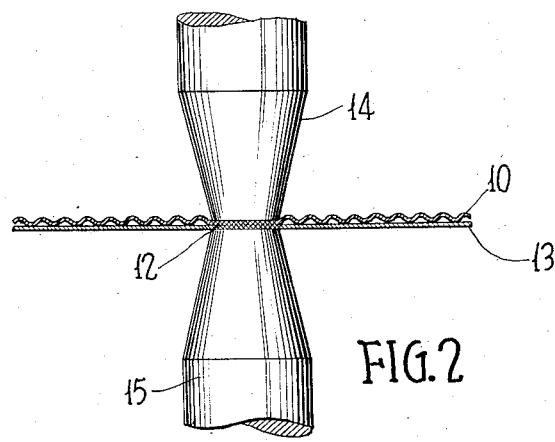
Fig. 2 shows a magnified cross section illustrating a point of securement with a flat surface.

Shown in perspective in Fig. 1, is a sheet 10 corrugated in accordance with the teachings of my invention wherein may be seen at the left hand edge 11 the relative proportions of the corrugations to the width of the sheet. At several points on the sheet are areas 12 showing spot welds made on material of this type. The cross section of this material, greatly magnified, is substantially as seen in Fig. 2, wherein I have shown welded, a corrugated member 10 to a flat surface 13 which may be any framework or supporting member. In the drawing the welding electrodes, 14 and 15 are of relatively large magnitude extending over a plurality of corrugations the area 12 therebetween being a welded joint between the two members 10 and 13. This inclusion of several corrugations by the electrode is assured by the low ratio of corrugation pitch to metal thickness, which ratio as above stated is about three to one.

Sheet material made in this manner has a greater tensile strength because of the cold working. The effective thickness of the sheet material is substantially three times the thickness of the metal itself whereas the increase in weight is only about one-third more than a plain sheet. It is quite obvious that the desirable characteristics of this material will make it especially appropriate for use as the skin element in the fabrication of airplane parts. The increased stiffness and greater tensile strength, greater in proportion, than the relative increase in weight is especially valuable because of the inherent weight, horsepower criterion in such structures. Because of the fineness of corrugation in proportion to the thickness of metal, the forming of the corrugated contour of the sheet is preferably effected by a drawing of the metal. This action on the metal is very beneficial to the resultant material, inasmuch as it increases the tensile strength.

The application of the invention to stainless steel is also of considerable importance. In respect to the resistance to corrosion which is one of the desirable characteristics of duralumin, stainless steel will give greater strength for the same unit weight while at the same time being a material more suitable for welding, and less subject to failure from fatigue strains.

Figure 3:
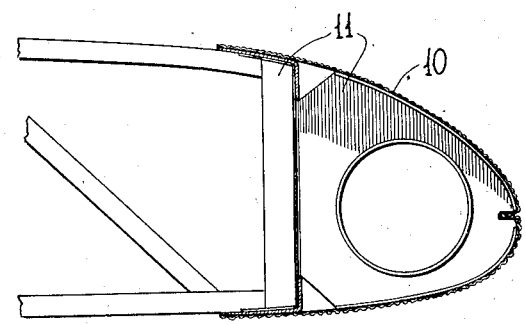
Fig. 3 shows an application of my new structural material to the nose of an airplane wing.

When applying the structural sheet material of my invention to the nose or leading tip of an airplane wing structure as illustrated in Fig. 3, where 11 designates the framework and 10 the skin, although the corrugations are transverse to the direction of motion of the airplane and would naturally be expected to increase the air drag, the small depth giving the desirable increase in stiffness does not add to the drag.

The embodiment of my invention herein illustrated and described has been illustrated for the purpose of clearly setting forth the principles involved, but it will be apparent that the invention is susceptible of being modified to meet the different conditions encountered in its use and I therefore aim to cover all modifications within the true spirit and scope of this invention by the appended claim.

What I claim is:

Corrugated sheet metal of relatively light gauge such as commonly used for the skin element of airplane wing structures having corrugations of a pitch not greater than three times metal thickness and a depth not greater than three times metal thickness.

JOHN C. WHITESELL, Jr.